United States Patent Office  3,510,272
Patented May 5, 1970

3,510,272
METHOD FOR PRODUCING CALCIUM AND MAGNESIUM ALUMINUM OXYHYDROXIDES
Horst W. Schmank, Ringgold, Ga., and James M. Holbert, Lookout Mountain, Tenn., assignors to Chattem Chemicals, Division of Chattem Drug & Chemical Company, Chattanooga, Tenn., a corporation of Tennessee
No Drawing. Continuation-in-part of application Ser. No. 442,617, Mar. 25, 1965. This application Feb. 18, 1969, Ser. No. 800,270
Int. Cl. C01f 5/00; C01g 7/00; C01h 11/00
U.S. Cl. 23—315                                   12 Claims

ABSTRACT OF THE DISCLOSURE

Method for the preparation of calcium and magnesium aluminum oxyhydroxides which involves the controlled hydrolysis of a mixed calcium or magnesium aluminum alcoholate.

CROSS REFERENCE TO RELATED APPLICATION

This application is a continuation-in-part of our co-pending application, Ser. No. 442,617, Mar. 25, 1965 now abandoned.

BACKGROUND OF THE INVENTION

Field of the invention

This invention is in the field of preparing improved derivatives of aluminum oxyhydroxide, specifically the calcium and magnesium derivatives thereof, wherein a mixed alcoholate of aluminum with one of the aforementioned metals is hydrolyzed in an amount of water stoichiometrically required to produce the compound, and the compound is thereafter recovered.

DESCRIPTION OF THE PRIOR ART

Some oxyhydroxides of aluminum have been prepared, as shown in French Patent M26 by the reaction of sodium aluminate with magnesium chloride and hydrogen chloride. However, this type of process does not usually result in the recovery of a material having a good acid consuming ability or solubility in dilute acids.

Compounds produced according to the process of the present invention have been shown to have high capacity as gastric antacids since they are able to maintain the pH of the gastric juices at desirably high levels for extended periods of time. They are also useful in the ceramic industry since by firing these compounds in a high temperature furnace, high purity spinels are obtained. Since the compounds of the present invention exist in an amorphous or partially amorphous state, lower firing temperatures can be employed.

In addition, the process of the present invention makes it possible to carefully control the relative amounts of magnesium or calcium in the molecule.

SUMMARY OF THE INVENTION

The present invention provides a method for preparing a compound having the monomeric empirical formula $X_mAl_nO_xH_y$ where X is a divalent metal which is either magnesium or calcium, $m$ and $n$ in the range from 0.01 to 2, $m+n$ is no more than 3, $x$ is from 4 to 6 and $y$ is from 3 to 4. This process involves hydrolyzing a mixed alcoholate of aluminum and the divalent metal (an alcoholate which contains both aluminum and the divalent metal) with the amount of water stoichiometrically required to produce the compound and thereafter removing any volatiles present in the reaction mixture, thereby recovering the compound.

The empirical formula is referred to as a monomeric formula, because in some cases these compounds can exist in polymeric form. Furthermore, some of these compounds normally exist as hydrates, but the empirical formula given above in all instances applies to the anhydrous product even though they may not normally exist as such.

The following specific compounds coming within the class definition have been found to have excellent antacid properties.

(1) Magnesium dialuminum oxyhydroxide:

$MgAl_2O_6H_4$

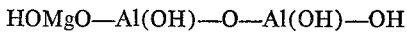
HOMgO—Al(OH)—O—Al(OH)—OH (2) Magnesium aluminum oxyhydroxide:

$MgAlO_4H_3$

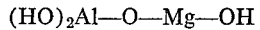
$(HO)_2Al$—O—Mg—OH (3) Dimagnesium aluminum oxyhydroxide:

$Mg_2AlO_5H_3$

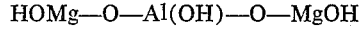
HOMg—O—Al(OH)—O—MgOH (4) Calcium dialuminum oxyhydroxide:

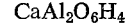
$CaAl_2O_6H_4$

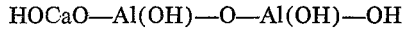
HOCaO—Al(OH)—O—Al(OH)—OH (5) Calcium aluminum oxyhydroxide:

$CaAlO_4H_3$

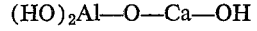
$(HO)_2Al$—O—Ca—OH (6) Dicalcium aluminum oxyhydroxide:

$Ca_2AlO_5H_3$

HOCa—O—Al(OH)—O—CaOH

The starting materials in the process of the present invention are the mixed aluminum-calcium or aluminum-magnesium alcoholates. These materials can be prepared by a variety of processes. The following specific examples illustrate some of these processes.

EXAMPLE I

Two mols (410 grams) of aluminum isopropoxide were refluxed for more than 42 hours with 30 grams of magnesium metal which had been pretreated in isopropanol and iodine, in the presence of 500 ml. of anhydrous isopropanol. When the magnesium to aluminum ratio was nearly 1 to 2, the reaction was stopped by the removal of the alcohol by distillation and the magnesium-aluminum isopropoxide was purified by vacuum distillation, yielding over 520 grams of high purity magnesium-aluminum isopropoxide.

While the foregoing examples and succeeding examples deal with the preparation and use of alcoholates which are isopropylates, it should be understood that similar results can be obtained by using alcoholates having from 2 to 5 carbon atoms in each of their alcoholate groups.

EXAMPLE II

One mol of anhydrous magnesium chloride (95.5 gms.) was carefully dissolved in 500 ml. of isopropanol to form a white solid salt. To this mixture, there was added 2 mols of liquid aluminum isopropoxide and 1 mol with a 2% excess of ethylene diamine. The white salt was dissolved exothermically and the basic hydrochloride was precipitated as a crystalline material. After filtration and removal of the remaining isopropanol, the magnesium aluminum isopropoxide was purified by vacuum distillation.

Instead of the magnesium chloride as specified above, other anhydrous magnesium salts such as the bromide, iodide or sulfate can be used in this process. In addition, other anhydrous bases such as ammonia, ethylamine, and the like can be used in place of ethylene diamine except that recovery of the hydrochloric salt becomes more difficult with increasing solubility in the alcohol media.

Another method of manufacturing the mixed alcoholate consists in reacting magnesium carbide or magnesium nitride with anhydrous isopropanol in the presence of liquid aluminum isopropoxide to form the magnesium aluminum isopropoxide and acetylene, methylacetylene, or ammonia as by-products.

It should be understood that the corresponding calcium compounds can also be used in the foregoing examples to produce the corresponding calcium aluminum alcoholates.

In accordance with the present invention, the mixed calcium or magnesium aluminum alcoholates are hydrolyzed under controlled conditions, either alone, or in the presence of other calcium and magnesium sources to produce the improved calcium and magnesium aluminum oxyhydroxides. The amount of water present is substantially that which is required stoichiometrically to produce the particular oxyhydroxide derivative although some excess water can be tolerated. The reaction is carried out in the presence of an alcohol, normally consisting of the alcohol corresponding to the alcoholate involved in the reaction. After the reaction has occurred, the volatiles are removed preferably by spreading the reaction product over a large extended area in a relatively thin film and then subjecting the same to a current of hot moist air.

The following specific examples illustrate the preparation of compounds according to the present invention.

EXAMPLE III

The compound magnesium dialuminum oxyhydroxide was prepared by hydrolysis of a magnesium aluminum alcoholate in the following manner. It should be noted in the examples referring to alcoholates, that the alcoholate should have from 2 to 5 carbon atoms in each of its alcoholate groups. For reasons of convenience and economy the isopropylate is preferred.

Magnesium aluminum isopropylate (550 grams; 1 mol) was diluted with 300 ml. of anhydrous isopropyl alcohol and placed in a closed vessel equipped for reflux, stirring and liquid addition. The solution was brought to gentle reflux temperature with heat and stirring and then a mixture of 54 grams (3 mols) of water in 300 ml. of anhydrous isopropyl alcohol was added gradually over a 2 to 2½ hour period. Vigorous agitation was required throughout the reaction period. After the addition of the aqueous isopropyl alcohol was completed, the mixture was refluxed with stirring for ½ to 1 hour. At the end of this time, a second solution of water (36 grams; 2 mols) in 250 ml. of anhydrous isopropyl alcohol was added over a period of no less than 1 hour, after which stirring and refluxing was continued for at least an additional 2 hours.

At the end of the reaction time, the condenser was arranged for distillation and approximately 70% of the isopropyl alcohol used in the reaction process was removed at atmospheric pressure. At about this point, the material in the flask became solid and heating and distillation were continued until the temperature of the solid powder reached 125 to 135° C. At this point, a gentle vacuum of 5 inches was applied to the system and gradually increased as conditions of distillation and dusting permitted the application of a full vacuum of 29 inches. The temperature during this drying process was maintained at 130 to 140° C.

After drying at full vacuum conditions for ½ to 1 hour, the product containing 15 to 20% isopropyl alcohol was removed from the reactor. This apparently dry powder was further dried in a circulating hot air dryer until the isopropyl alcohol content was reduced to less than 2%. Cautious addition of moisture to the circulating hot air aids in the removal of the tightly bound alcohol.

EXAMPLE IV

Calcium dialuminum oxyhydroxide was prepared by the procedure given in Example III by substituting calcium aluminum isopropylate for the corresponding magnesium compound of Example I. The molar amounts of water used in the controlled hydrolysis and the temperatures involved were the same as in Example III.

EXAMPLE V

A low magnesium oxide containing aluminum oxyhydroxide was prepared as follows: 500 grams of pure liquid aluminum isopropoxide was mixed hot with a predetermined amount of magnesium aluminum isopropoxide. The amount was calculated to include the magnesium contained in the mixed alcoholate so as to achieve a 0.01% magnesium oxide content in the final product. The mixture was then hydrolyzed by spreading it out on a large surface and subjecting it to hot moist air in an ordinary dry oven until practically all of the isopropyl alcohol had been removed. A hydrated product was produced which analyzed from 0.009 to 0.015% magnesium oxide, and 75 to 79% alumina.

The compound magnesium aluminum oxyhydroxide can also be prepared by reacting magnesium aluminum isopropoxide with 1 molecular proportion of magnesium oxide or magnesium hydroxide in isopropanol in the presence of the required amount of water to produce the magnesium aluminum oxyhydroxide. The corresponding calcium compound can be produced by reacting calcium aluminum isopropoxide with 1 molecular proportion of either calcium oxide or calcium hydroxide.

The dimagnesium aluminum oxyhydroxide can be prepared by reacting 1 molecular proportion of magnesium aluminum isopropoxide with 3 molecular proportions of magnesium oxide or magnesium hydroxide in isopropanol in the presence of the stoichiometric amount of water to produce a reaction product which upon the removal of volatiles yields the monohydrate of dimagnesium aluminum oxyhydroxide. The corresponding calcium compound is prepared by substituting the corresponding calcium compounds in this reaction.

The process of the present invention provides products which are characterized by high purity, and a higher acid consuming capability than similar products produced by other processes. Furthermore, it is possible with the process of the present invention to control carefully the relative amounts of magnesium or calcium in the oxyhydroxide to achieve a predetermined ratio of metals in the final molecule.

It should be evident that various modifications can be made to the described embodiments without departing from the scope of the present invention.

We claim as our invention:

1. The method of preparing a compound having a monomeric empirical formula $X_mAl_nO_xH_y$ where X is divalent metal selected from the group consisting of magnesium and calcium, $m$ and $n$ are in the range from 0.01 to 2, $m+n$ is no more than 3, $x$ is from 4 to 6 and $y$ is from 3 to 4 which comprises hydrolyzing a mixed alcoholate of aluminum and said divalent metal with the amount of water stoichiometrically required to produce said compound and thereafter removing any volatiles present in the reaction mixture to thereby recover said compound.

2. The method of claim 1 in which said alcoholate is dissolved in an alcohol vehicle.

3. The method of claim 1 in which said alcoholate has from 2 to 5 carbon atoms in each of its alcoholate groups.

4. The method of claim 1 in which volatiles are removed by spreading the reaction mixture over a large surface and subjecting the same to hot moist air.

5. The method of claim 1 in which the hydrolysis medium also includes a compound selected from the group consisting of the oxides and hydroxides of said selected metal.

6. The method of claim 1 in which the hydrolysis medium also includes magnesium oxide.

7. The method of claim 1 in which the hydrolysis medium also includes magnesium hydroxide.

8. The method of claim 1 in which the hydrolysis medium also includes calcium oxide.

9. The method of claim 1 in which the hydrolysis medium also includes calcium hydroxide.

10. The method of preparing a compound having the monomeric empirical formula $XAl_2O_6H_4$ where X is a divalent metal selected from the group consisting of magnesium and calcium which comprises refluxing a mixed alcoholate of aluminum and said divalent metal, adding water to the refluxing alcoholate, and then removing the volatile constituents of the reaction mixture to leave said compound in solid form.

11. The method of claim 10 in which said alcoholate is magnesium aluminum isopropoxide.

12. The method of claim 10 in which said alcoholate is calcium aluminum isopropoxide.

References Cited

UNITED STATES PATENTS

| | | | |
|---|---|---|---|
| 2,692,239 | 10/1954 | Hunter et al. | 23—201 X |
| 2,776,188 | 1/1957 | Gilbert | 23—201 X |
| 2,888,323 | 5/1959 | Teichner | 23—201 X |
| 2,892,782 | 6/1959 | Caffrey | 260—448 X |
| 2,923,660 | 2/1960 | Hallman | 23—315 X |

OTHER REFERENCES

"Chemical Abstracts"; vol. 58, 1963; p. 275. Roberts, M. H.; "Journal of Applied Chemistry," October 1957, pp. 543–46.

OSCAR R. VERTIZ, Primary Examiner

G. O. PETERS, Assistant Examiner

U.S. Cl. X.R.

23—201